A. Warth,
Converting Motion.
N° 16,155.   Patented Dec. 2, 1856.
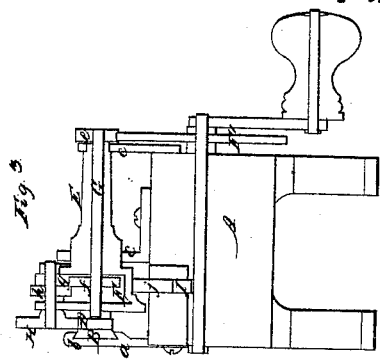
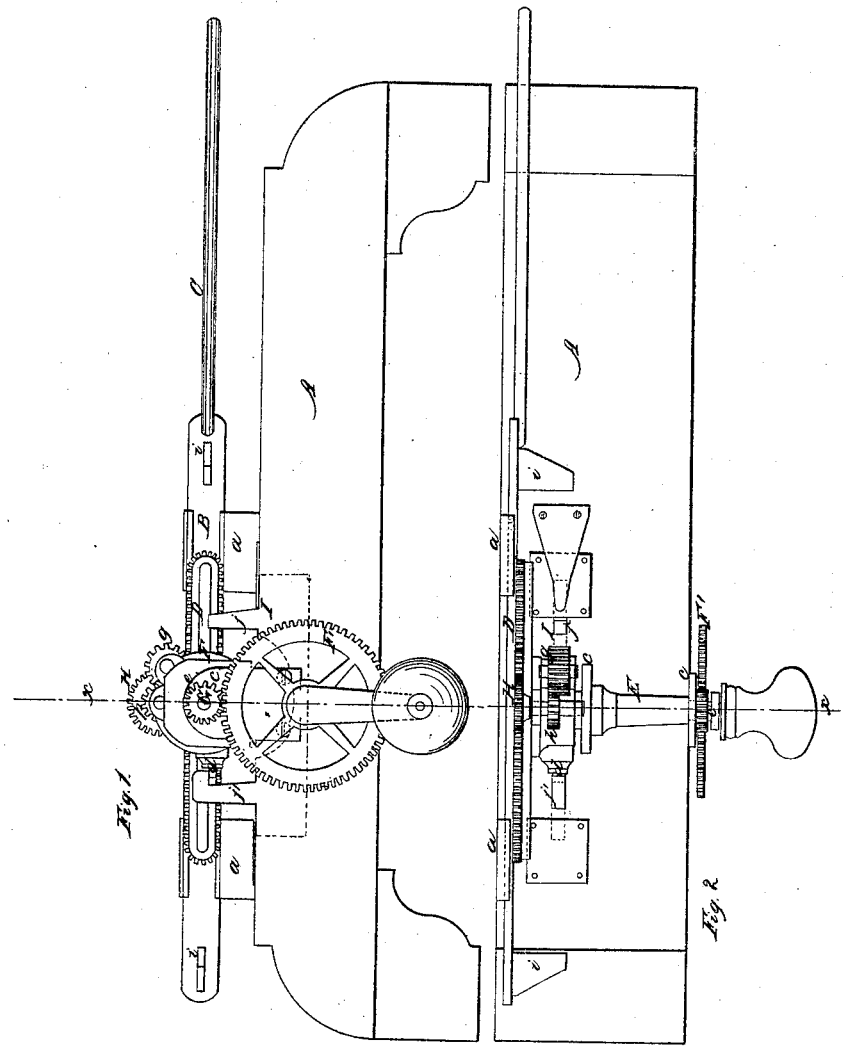

UNITED STATES PATENT OFFICE.

ALBIN WARTH, OF NEW YORK, N. Y.

CONVERTING ROTARY INTO RECIPROCATING MOTION.

Specification of Letters Patent No. 16,155, dated December 2, 1856.

*To all whom it may concern:*

Be it known that I, ALBIN WARTH, of the city, county, and State of New York, have invented a new and Improved Device for Converting a Rotary into a Reciprocating Motion, and Vice Versa; and I do hereby declare that the following is a full, clear, and exact description of the same, reference being had to the annexed drawings, making a part of this specification, in which—

Figure 1, is a side view of my improvement. Fig. 2, is a plan or top view of ditto. Fig. 3, is a transverse vertical section of ditto, (*x*) (*x*), Figs. 1 and 2, showing the plane of section.

Similar letters of reference indicate corresponding parts in the several figures.

To enable those skilled in the art to fully understand and construct my invention, I will proceed to describe it.

A, represents a stock or bed piece, to one side of which two uprights (*a*) (*a*) are attached, said uprights having horizontal grooves. (*b*) cut in their inner sides to receive a bar B, which is allowed to slide freely back and forth in said grooves. A shaft C, is attached to the bar B.

D, represents an endless rack, which is attached to the inner side of the bar B. The form of this rack is plainly shown in Fig. 1.

E, represents a hollow shaft which works in uprights (*c*) (*c*) attached to the stock A. The shaft E, has a hollow head F, at its inner end, said head having a pin (*d*) projecting from its periphery. See Figs. 1 and 2.

G, is a shaft which is fitted and works within the shaft E. This shaft has a pinion (*e*) on its outer end, in which a toothed driving wheel F, gears. The opposite or inner end of the shaft G, has a toothed wheel (*f*) upon it, said wheel being within the hollow head F, as shown in Fig. 3. The wheel (*f*) gears into a wheel (*g*) the axis of which has its bearings in the sides of the head F, at its periphery, as clearly shown in Fig. 1. The wheel (*g*) gears into a pinion (*h*), the axis of which also has its bearings in the sides of the head F, at its periphery. To one end of the axis of the pinion (*h*) a pinion H, is attached, and this pinion H, gears into the rack D. The inner end of the shaft G, fits between the upper and lower part of the rack.

To each end of the bar B, on its inner side there is attached a projection (*i*) and I, is a sliding bar having an upright (*j*) at each end, one of which (*j'*) is bent or hooked at its upper end. These uprights are placed one at each side of the head F, as shown clearly in Figs. 1 and 2.

The operation is as follows: By turning the shaft G, motion will be given the pinion H, through the medium of the gearing (*f*) (*g*) (*h*), and the pinion H, will move the rack D, and when the end of the rack reaches the pinion, the head F, will make half a revolution, so that the pinion H, will pass around the end of the rack and gear into its under side. The head also makes another half revolution when the opposite end of the rack D, reaches the pinion H, so that said pinion may pass around upon the upper side of the rack. By this means a reciprocating motion is given the bar B, and shaft C, when the shaft G, is rotated, or by working the bar B, back and forth a rotating motion is given the shaft G. The head F, is turned at the proper time in the following manner. It will be seen that the axis of the pinion H, is not in line with the shaft G, and consequently a leverage power is obtained between said pinion and the shaft G. The friction of the gearing (*f*) (*g*) (*h*) would prevent the pinion H, turning were the head F, allowed to be perfectly free, as the head and hollow shaft E, would turn instead. The head F, therefore is held or prevented from turning by the upright stops (*j*) (*j'*) against which the pin (*d*) catches alternately just after the pinion has passed around the ends of the racks, said stops being freed from the pin by the action of the projections (*i*) (*i*) on the bar B, which projections at the end of each movement of the bar B, move the slide bar I, and cause the stop which holds the head to be moved beyond the pin (*d*) which when the head has made its semi-revolution is caught by the other stop.

The above invention is applicable to various kinds of machinery.

The device is simple and works with but little friction.

This arrangement materially differs it will be observed from other reciprocating endless rack and rotating pinion devices for the same purpose, in some of which the rack has a tilting action given it at the end of each stroke to cause the pinion to work above and below it, and in others the driving pinion is made alternately to rise and fall around the ends of the reciprocating rack, in the latter of which cases it is extremely inconvenient to communicate by engine power or otherwise the necessary movement to the pinion on account of its shifting its center of action, while in the former case the rack shifts its straight line of action and consequently for many purposes becomes perfectly useless; but in my arrangement not only may the power be communicated to a shaft (G) having a fixed center but by the arrangement of the follow head (F) with its gearing operating as described the reciprocating rack also preserves its uninterrupted straight line of action or travel in a fixed straight course and the rack and operating gear preserve as regular constant or even a mesh as ordinary spur wheels in gear do, there being in reality no change of gear as is the case in many other double rack devices for a like purpose and which are generally inoperative for an ordinary speed owing in a measure to the breakage of the cogs in gear when changing gear as referred to, and this objection applies to all alternate connections and disconnections of gear wherever a heavy weight has to be set in motion at anything approaching a quick speed. My arrangement, it will be obvious, is devoid of this objection and the quickest velocity may with safety be obtained, the action being that of a positive smooth spur driving gear always in connection the one device with its fellow without change to another or change in run of the rack from a straight line or change of the center of rotation of the main driving or driven shaft (G), which for the longest stroke of rack (and I consider my invention particularly applicable to a long stroke) the devices driving the rack, or being driven by the rack as the case may be, occupy but a small amount of space, no more in fact of necessity for a long stroke than a short stroke rack.

What I claim as new and useful, and desire to secure by Letters Patent, is—

The intermittent semirotating head (F) or its equivalent, carrying, in eccentric relationship to the bearing of said head, a driving pinion H for gear with the endless rack (D) and driven by or operating through suitable gear a pinion $f$ arranged, with separate action, concentric to said head, the latter being combined with sliding stops ($j$ $j$) or their equivalents, all arranged and operating together substantially as and for the purposes set forth.

ALBIN WARTH.

Witnesses:
WM. TUSCH,
JAMES F. BUCKLEY.